Sept. 4, 1928.
J. W. PEASE
1,683,481
METHOD OF AND APPARATUS FOR SEED CELLING APPLES
Filed March 4, 1927     4 Sheets-Sheet 1
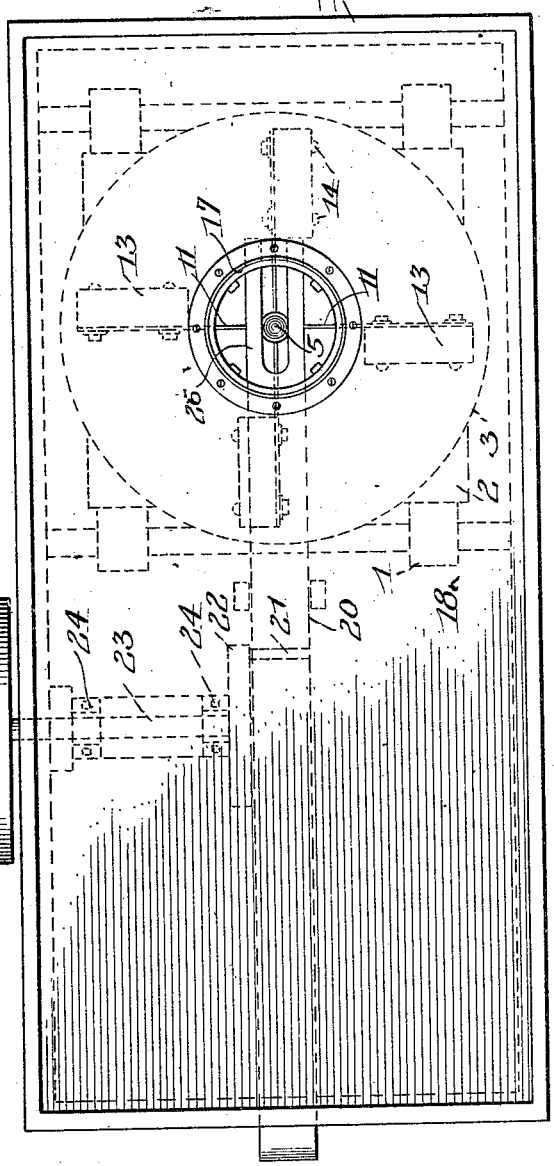
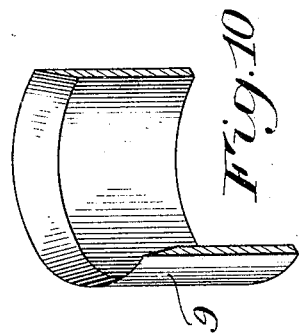
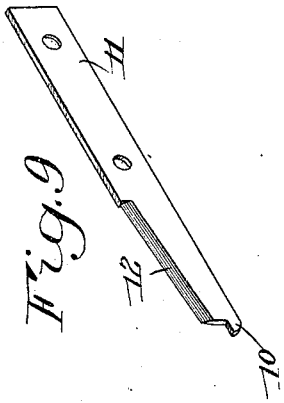
INVENTOR
John W. Pease
BY
his ATTORNEYS

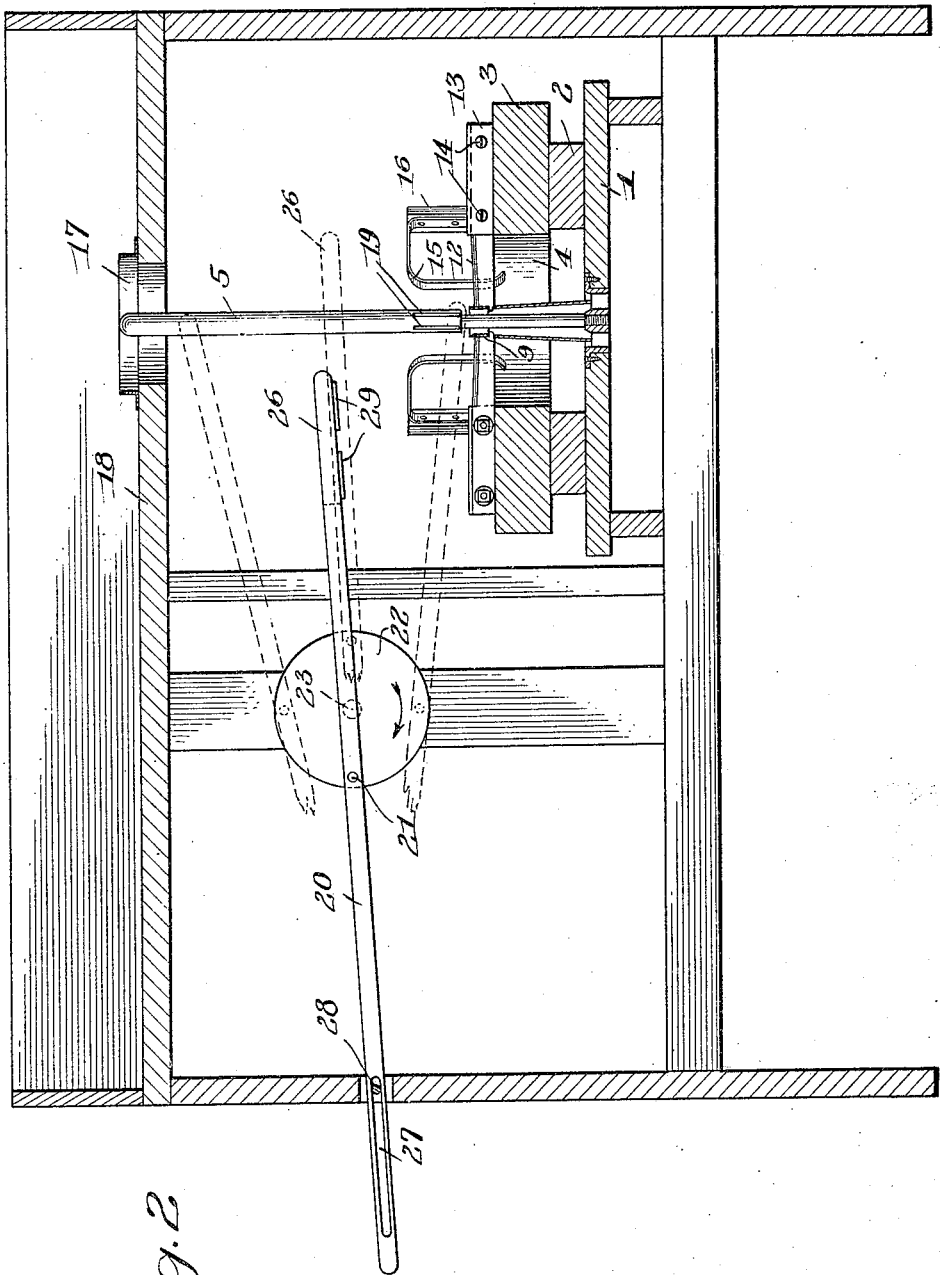

Sept. 4, 1928.
J. W. PEASE
1,683,481
METHOD OF AND APPARATUS FOR SEED CELLING APPLES
Filed March 4, 1927    4 Sheets-Sheet 3
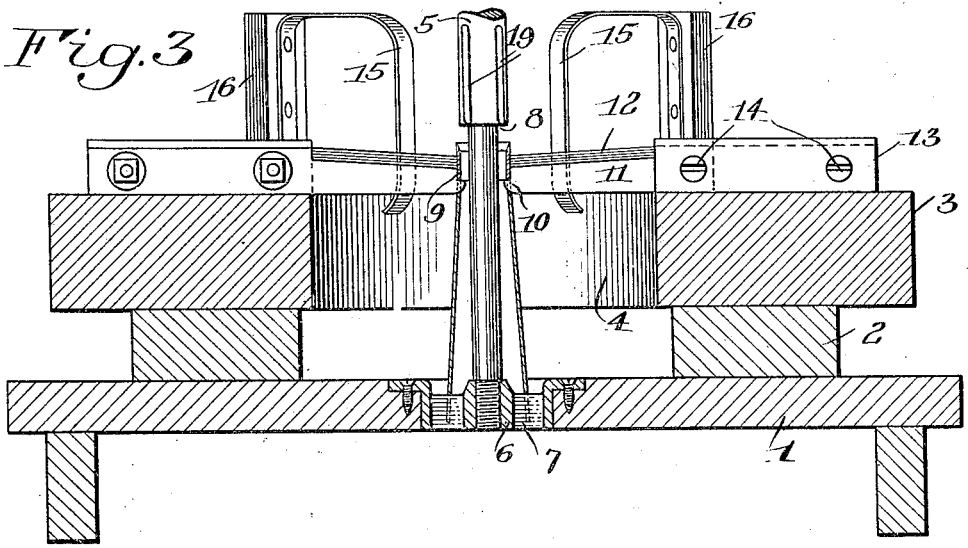
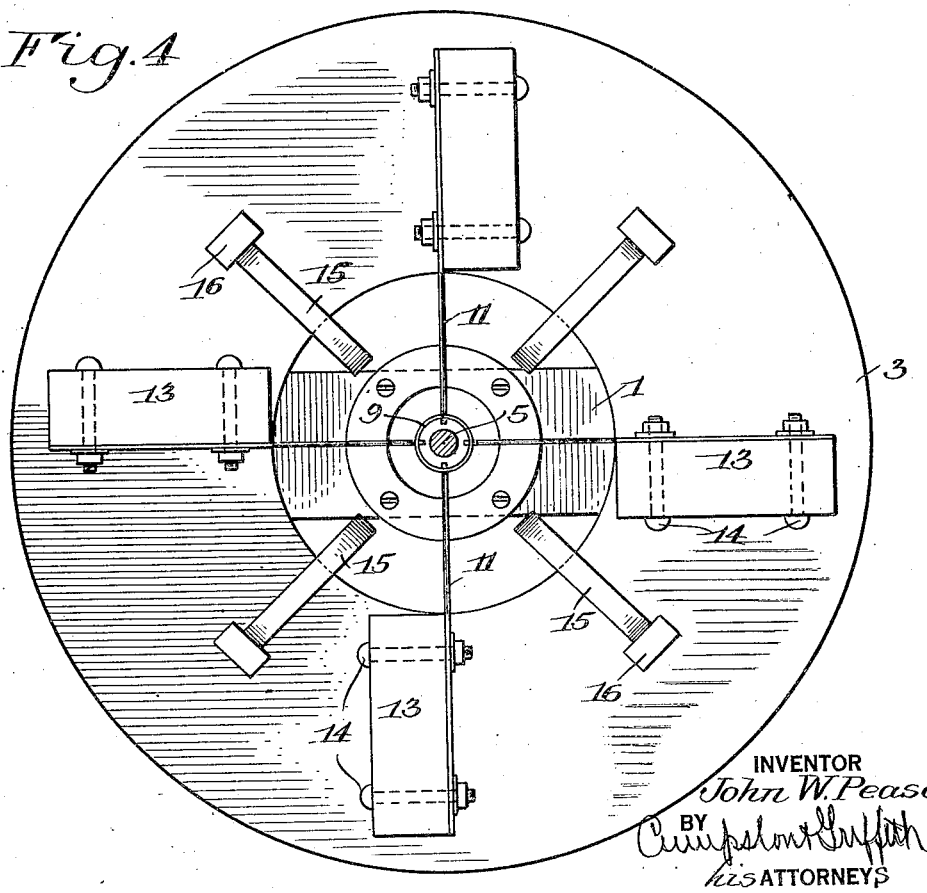
INVENTOR
John W. Pease
BY
his ATTORNEYS Sept. 4, 1928.　　　　　　　　　　　　　　　　　1,683,481
J. W. PEASE
METHOD OF AND APPARATUS FOR SEED CELLING APPLES
Filed March 4, 1927　　　　4 Sheets-Sheet 4

INVENTOR
John W. Pease
BY
his ATTORNEYS

Patented Sept. 4, 1928.

1,683,481

UNITED STATES PATENT OFFICE.

JOHN W. PEASE, OF ROCHESTER, NEW YORK, ASSIGNOR TO WINNIFRED N. PEASE, OF ROCHESTER, NEW YORK.

METHOD OF AND APPARATUS FOR SEED-CELLING APPLES.

Application filed March 4, 1927. Serial No. 172,832.

My present invention relates to the art of preparing apples for cooking, canning and drying and more particularly to a method of and apparatus for completely coring or trimming the interior of the apple so that all of the radiating extremities of the tough seed cells are removed as well as the main core, seeds, stem and bud. The object of the invention is to improve such methods and apparatus and produce an extremely simple, efficient, durable and rapidly operating machine of this character. A further object of the invention is to combine with the interior trimming devices means for slicing or quartering the apple at the same time.

To these and other ends the invention consists in certain improvements and combinations of parts, all as will be hereinafter more fully described, the novel features being pointed out in the claims at the end of the specification.

In the drawings:

Figure 1 is a top plan view of an apple trimming machine constructed in accordance with and illustrating one embodiment of my invention;

Figure 2 is a central vertical section;

Figure 3 is an enlarged section in the same plane as Figure 2 showing the knives and apple guide, the latter being broken away;

Figure 4 is a plan view of the elements shown in Figure 3 with the apple supporting guide in horizontal section;

Figure 9 is a detail perspective view of one of the quartering knife supports for the trimming knife, and Figure 10 is a perspective view of a section of the trimming knife.

Similar reference numerals throughout the several views indicate the same parts.

Figure 5:
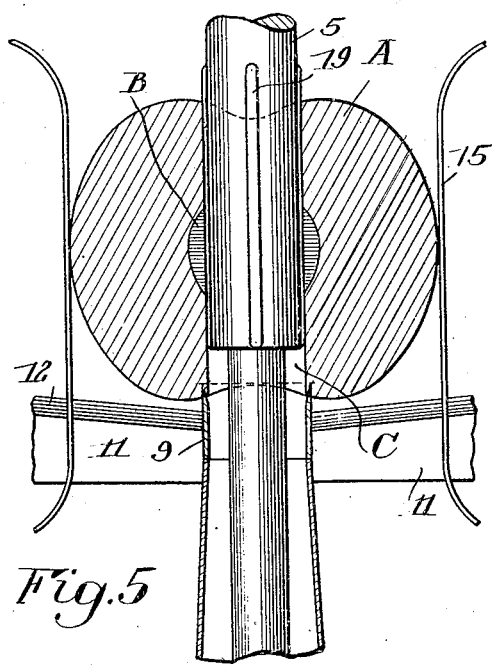
Figure 5 is a further enlarged view of a portion of the trimming knife in section, and portions of the apple guiding and supporting means.

As is well known, apples are commonly pared and cored at the same time or substantially simultaneously on a machine which brings an apple impaled on a rotating fork against a knife. As soon as the work of the knife is completed what is called a "coring tube" is brought axially against the end of the apple, which coring tube removes the center, leaving a hole through the apple from end to end. My invention applies to the further treatment of apples that are in this condition for the following reasons:

Considering the core of an apple in its entirety, it comprises five radiating seed cells or pockets that are of a tough fibrous texture and are very annoying and unpalatable when fragments thereof are left in prepared apple food. Over all, or taken on their maximum diameter, these cells occupy a substantial proportion of the total diameter of the apple. If a coring tube is used that is of sufficient size to carve out the entire actual core including the tips of the seed cells, it not only wastes a great deal of good pulp lying between the cells and at the ends of the apples, but is very apt to split the apple, breaking it up in an irregular manner. The latter result is explained by the fact that the coring tube is forced into the solid apple and jammed between the surrounding pulp on the outside and the hard central core that lodges firmly in the interior and later requires to be removed by a special ejector.

In the practice of my invention, I take the apple from the ordinary paring machine in the pared and partially cored condition that I have described and trim the interior thereof further by a method that embodies cutting back the walls of the core hole in an axially longitudinal direction and on a diameter greater than that of the core hole, and less than the maximum diameter of the seed cell pockets of the apple whereby the tips or fragments of tough seed cells remaining in the cored walls are pried or lifted out and discharged through the core with very little waste of pulp and without placing the apple under any appreciable stresses.

Referring more particularly to the drawings in which a machine for accomplishing these results is shown, 1 indicates the main frame having cleats 2 thereon supporting in spaced relationship a preferably annular wooden table 3, the central opening of which is shown at 4. Rising centrally and vertically through this opening is an apple guiding and supporting rod 5. In the present instance it is held by a spider bushing 6 secured in the main frame 1 as shown and leaving openings 7 through the top of the frame adjacent to the base of the rod for the escape of the seed cells, as will be hereinafter explained.

The upper portion of the guiding and supporting rod 5 above the table 3 is preferably of slightly greater diameter than the lower portion, the two parts joining at the shoulder 8. The lower end of the upper part adjacent to the shoulder 8 is provided for a short distance, approximately the diameter of an apple, with external longitudinal ribs 19 projecting radially therefrom. Just below the shoulder 8 near the top plane of the table 3 the rod is encircled in spaced relationship by a substantially circular or ring shaped knife 9. Its upper cutting edge is beveled from the inside as shown and it may be in the form of a relatively long tube or chute of progressively increasing diameter in a downward direction with its lower end slotted and supported in the spider 6. Its upper end has suitable slots to receive shoulders 10 on a plurality of radially arranged supporting knives 11, the cutting edges of which are at the top as indicated at 12. These radial quartering knives 11 are secured to the top of the table 3 at points surrounding the central opening 4 by means of blocks 13 and bolts 14 so that they are removable and, by their removal, render the central knife ring 9 removable for cleaning or repair.

Surrounding the lower portion of the guide rod 5 in the region of the knife 9 and extending between the quartering knives 11 are a plurality of downwardly projecting, rounded, spring leaves or fingers 15. These are interspersed with the knives and form a yielding guide for the exterior of an apple passing down the rod, being sufficiently separated for this purpose and supported in the present instance upon posts 16 on the table 3.

Figure 6:
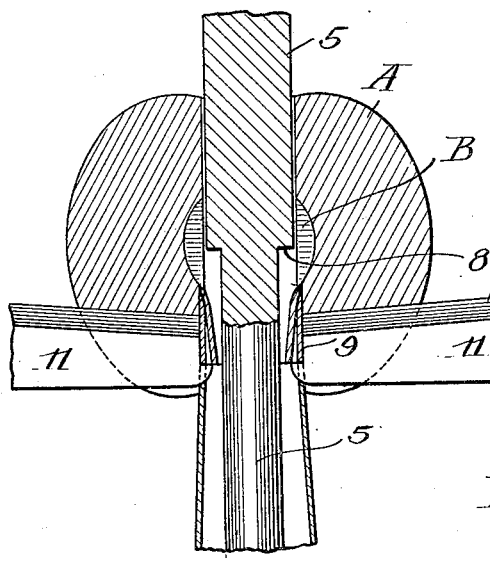
Figure 6 is a similar view showing a certain point in the progress of the cutting or trimming operation.
Figure 8:
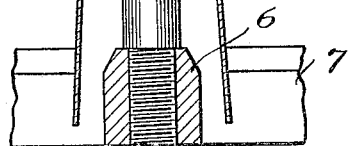
Figure 8 is a horizontal section through the apple on the line 8—8 of Figure 7.

The operation of the machine as so far described is as follows:

The cored apple is impaled upon the upper end of the supporting and guiding rod 5, the tip of which projects, in the present instance, through a feed opening 17 in an upper platform or tray 18 of the main frame 1. This portion of the rod is of the same size as the core opening or hole in the apple. The ribs 19 further down are of course, of greater diameter collectively and as the apple is pressed down the rod by devices hereinafter described it is forced over these ribs which gently press in to the walls of the core hole to hold the apple firmly and against rotation without any tendency, however, to split it. At the same time the exterior guides 15 also engage the exterior surfaces of the apple. It proceeds thence against the knives 9 and 11 as shown in Figure 5, the apple being indicated at A and the portions of the seed cells that remain therein being indicated at B. The diameter of the ring knife 9 is slightly greater than the core hole indicated at C and therefore slightly greater than the upper portion of the guiding and supporting rod. As the apple proceeds still further to the point shown in Figure 6 the ring knife 9, cutting a thin slice along the core wall, engages the tips of the seed cell fragments B and lifts them or routs them out so that they fall through the tubular knife and out at 7. The knives being below the shoulder 8, they surround a reduced portion of the rod and give a clear and widening passage for the waste to fall through.

In other words the ring knife 9 being of slightly larger diameter than the core hole and rod and yet smaller in diameter than the overall diameter of the seed pockets or cells, it has a tendency to and does pry out the cell fragments without removing a corresponding amount of the good surrounding pulp. Whatever the diameter of the celling knife it has no tendency to break or split the apple as, unlike the corer 2 that has previously operated, it provides relief from pressure or jamming through the ample tubular space on its interior.

Figure 7:
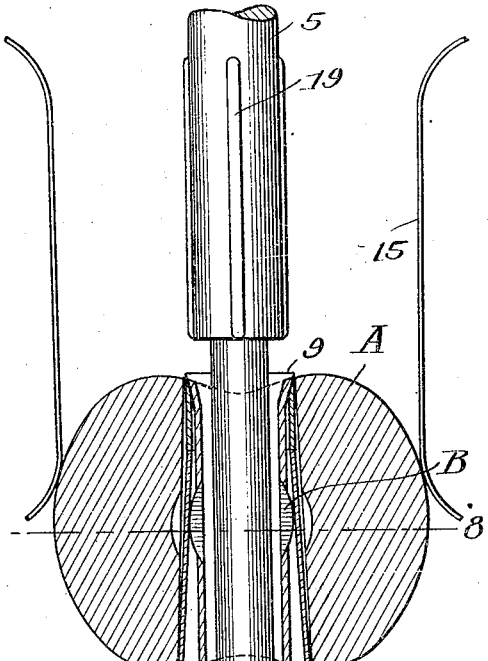
Figure 7 is a similar view showing the completion of the trimming operation.

The apple finally passes completely through the knives as shown in Figure 7 and through the action of the radial knives 11 it is not only trimmed interiorly, but is quartered and it falls in segments down through the opening in the frame exteriorly of the knife tube 9 to be disposed of or conveyed as desired.

It may be said at this point that when I refer herein to "quartering" the apple or to "quartering blades" I refer to the operation of slicing the apple longitudinally in any way and not necessarily cutting it into four segments. It is obvious that more or less than four quartering blades 11 can be provided.

In order that a machine of this character may operate with the greatest efficiency, and with the least waste, it is desirable that the apples should be graded before being celled, and a smaller ring knife 9 provided for the smaller apples. The outside guides 15 would be adjusted correspondingly.

To mechanically move the apples down the guiding and supporting rod 5 and through the knife, I provide a simple arrangement shown in Figures 1 and 2. It consists of a vibrating wiper arm 20 having a wrist pin connection 21 on a disc 22 carried by a shaft 23 having bearings 24 in the main frame 1 and turned by a pulley 25. The forward end of the arm is forked at 26 while the rear end is slotted at 27 and slides on a guide pin 28 as the disc 22 turns. The result is that the forked end 26 moves from the full line position of Figure 2 in which it clears an apple on the supporting and guiding rod 5 to the upper dotted line position in which it moves inwardly above the apple to embrace the rod; thence downwardly to the center dotted line position as it forces the apple along the rod and finally to the lowermost dotted line position where it has pressed the apple through the knives and is about to return to the first described position. Suitably formed raised contact portions 29 on the under side of the fork 26 clear the cutting edges of the knives and insure the passage of the top end of the apple completely through them.

The feeding device preferably thrusts the apples down one at a time, but if their deposit on the top end of the rod is too rapidly successive, the feeding arm will simply raise the apple momentarily until it can withdraw and pass it and reengage it properly on the top side.

I claim as my invention:

1. A method of trimming the interiors of apples which embodies coring the apple axially of its stem to remove the seeds and leave a relatively small core hole and then longitudinally cutting back the walls of the core hole in an axially longitudinal direction and on a diameter greater than that of the core hole and less than the maximum diameter of the seed cell pockets of the apple.

2. In a machine for trimming the interiors of cored apples to remove the seed cells, the combination with an apple support, of a substantially ring shaped knife arranged in concentric alinement with the core hole of an apple on the support, said knife being of greater diameter than the core hole, and means for moving the apple and knife relatively along their common axis.

3. In a machine for trimming the interiors of cored apples to remove the seed cells, the combination with an apple support, of a substantially ring shaped knife arranged in concentric alinement with the core hole of an apple on the support, said knife being of greater diameter than the core hole, radially arranged quartering knives associated with and supporting the ring knife, and means for moving the apple and knife relatively along their common axis.

4. In a machine for trimming the interiors of cored apples to remove the seed cells, the combination with a substantially ring shaped knife and a support therefor, of an apple supporting guide of smaller diameter than the knife associated with the latter in axial alinement.

5. In a machine for trimming the interiors of cored apples to remove the seed cells, the combination with a substantially ring shaped knife and a support therefor, of an apple supporting guide of smaller diameter than the knife extending centrally therethrough and means for thrusting an apple on the supporting guide axially against the knife.

6. In a machine for trimming the interiors of cored apples to remove the seed cells, the combination with a substantially ring shaped knife and a support therefor, of an apple supporting guide of smaller diameter than the knife consisting of a rod of the approximate diameter of the core hole of the apple and having outstanding longitudinal ribs, said rod extending centrally through the knife, and means for thrusting an apple on the supporting guide axially against the knife.

7. In a machine for trimming the interiors of cored apples to remove the seed cells, the combination with a main support, a substantially ring shaped knife and a plurality of relatively radially arranged quartering blades extending from the main frame and supporting the ring knife, of an apple supporting guide of smaller diameter than the knife extending centrally therethrough, and means for thrusting an apple on the supporting guide along the same against all of the knives, simultaneously.

8. In a machine for trimming the interiors of cored apples to remove the seed cells, the combination with a non-rotatable apple support, of a substantially ring shaped non-rotatable knife arranged in concentric alinement with the core hole of an apple on the support, said knife being of greater diameter than the core hole, and means for moving the apple and knife relatively along their common axis.

9. In a machine for trimming the interiors of cored apples to remove the seed cells, the combination with an apple supporting and guiding rod, a substantially ring shaped knife of greater diameter than the core hole of the apple surrounding the rod, and a wiper arm adapted to intermittently enter the paths of apples impaled upon the rod and to advance them forcibly against the knife.

10. In a machine for trimming the interiors of cored apples to remove the seed cells, the combination with a frame having a central opening, of a fixed apple supporting and guiding rod arranged in said opening and provided with longitudinal outstanding ribs along a portion of its length, a fixed substantially ring shaped knife of greater diameter than the rod surrounding the latter below the ribbed portion thereof, quartering knives spanning the opening in the frame and acting to support the ring knife and a wiper arm adapted to intermittently enter the paths of apples impaled upon the rod and to advance them forcibly against the knives.

11. The combination with a supporting and grinding rod for a cored apple, of fixed knives associated therewith, means for advancing an apple on the rod against the knives and resilient means for compressing the apple from the exterior.

JOHN W. PEASE.